(12) United States Patent
Greenspan et al.

(10) Patent No.: US 10,419,427 B2
(45) Date of Patent: *Sep. 17, 2019

(54) AUTHENTICATING IDENTITY FOR PASSWORD CHANGES

(71) Applicant: CA, Inc., New York, NY (US)

(72) Inventors: Steven L. Greenspan, Scotch Plains, NJ (US); Debra Danielson, Sillman, NJ (US); Kenneth W. S. Morrison, Vancouver (CA); Hongrui Gong, San Diego, CA (US)

(73) Assignee: CA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/136,778

(22) Filed: Sep. 20, 2018

(65) Prior Publication Data

US 2019/0036904 A1    Jan. 31, 2019

Related U.S. Application Data

(63) Continuation of application No. 15/335,711, filed on Oct. 27, 2016, now Pat. No. 10,122,706.

(51) Int. Cl.
| | |
|---|---|
| *H04L 29/06* | (2006.01) |
| *G06F 21/45* | (2013.01) |
| *G06F 21/31* | (2013.01) |

(52) U.S. Cl.
CPC ............ *H04L 63/083* (2013.01); *G06F 21/31* (2013.01); *G06F 21/45* (2013.01);
(Continued)

(58) Field of Classification Search
CPC .............. H04L 63/083; H04L 63/0861; H04L 63/1466; H04L 63/105; G06F 21/31; G06F 2221/2131
See application file for complete search history.

(56) References Cited

U.S. PATENT DOCUMENTS

| | | | |
|---|---|---|---|
| 6,240,184 B1* | 5/2001 | Huynh | G06F 21/31 380/206 |
| 6,910,135 B1* | 6/2005 | Grainger | G06F 21/316 709/202 |

(Continued)

OTHER PUBLICATIONS

Mat Honan, "How Apple and Amazon Security Flaws Led to My Epic Hacking," Wired.com, https://www.wired.com/2012/08/apple-amazon-mat-honan-hacking/, Aug. 16, 2012, 13 pages.

(Continued)

*Primary Examiner* — Nelson Giddins (74) *Attorney, Agent, or Firm* — Meyertons, Hood, Kivlin, Kowert & Goetzel, P.C.

(57) ABSTRACT

In an embodiment, a password risk evaluator may receive a request including a user identifier (ID) and a password. The password risk evaluator may retrieve a password preference model associated with the user ID, and may determine a risk score indicating a likelihood that the password is associated with the user ID. For example, the password preference model may be based on previous passwords used by the user, and may identify one or more characteristics, formulas, rules, or other indicia typically employed by the user in creating passwords. If the password supplied in the request matches or is similar to one or more elements of the password preference model, it may be more likely that the password in the request is a password supplied by the user. That is, the risk score may be an authentication of the user, or part of the authentication of the user, in some embodiments.

20 Claims, 5 Drawing Sheets

(52) U.S. Cl.
CPC ........ *H04L 63/0861* (2013.01); *H04L 63/105* (2013.01); *H04L 63/1466* (2013.01); *G06F 2221/2131* (2013.01)

(56) References Cited

U.S. PATENT DOCUMENTS

| | | | | |
|---|---|---|---|---|
| 8,555,357 | B1* | 10/2013 | Gauvin | G06F 21/577 380/286 |
| 8,819,810 | B1* | 8/2014 | Liu | G06F 21/31 726/18 |
| 9,348,981 | B1* | 5/2016 | Hearn | H04L 9/3271 |
| 9,407,652 | B1* | 8/2016 | Kesin | G06N 7/005 |
| 9,516,010 | B1* | 12/2016 | Avital | H04L 63/083 |
| 9,619,633 | B1* | 4/2017 | Mortensen | G06F 21/32 |
| 9,680,812 | B1* | 6/2017 | Emaminouri | H04L 63/08 |
| 9,697,521 | B2* | 7/2017 | Webb | G06Q 20/4014 |
| 9,852,287 | B1* | 12/2017 | Goldberg | G06F 21/46 |
| 2002/0184538 | A1* | 12/2002 | Sugimura | G06F 21/32 726/5 |
| 2006/0282660 | A1* | 12/2006 | Varghese | G06Q 20/341 713/155 |
| 2007/0214088 | A1* | 9/2007 | Graham | H04L 63/1416 705/51 |
| 2009/0089869 | A1* | 4/2009 | Varghese | G06F 21/31 726/7 |
| 2009/0172788 | A1* | 7/2009 | Vedula | H04L 63/08 726/5 |
| 2009/0293119 | A1* | 11/2009 | Jonsson | G06F 21/36 726/19 |
| 2010/0275258 | A1* | 10/2010 | Kamakura | G06F 21/32 726/19 |
| 2011/0047608 | A1* | 2/2011 | Levenberg | H04L 63/0807 726/7 |
| 2011/0138187 | A1* | 6/2011 | Kaga | G06F 21/32 713/186 |
| 2011/0202981 | A1* | 8/2011 | Tamai | G06F 21/10 726/6 |
| 2013/0254875 | A1* | 9/2013 | Sama | G06F 21/31 726/19 |
| 2015/0134956 | A1* | 5/2015 | Stachura | H04L 63/0807 713/168 |
| 2015/0135289 | A1* | 5/2015 | Hosabettu | G06F 21/46 726/6 |
| 2015/0254452 | A1* | 9/2015 | Kohlenberg | H04L 63/083 726/6 |
| 2015/0339477 | A1* | 11/2015 | Abrams | G06F 21/554 726/23 |
| 2015/0379253 | A1* | 12/2015 | Cook | G06F 21/32 726/19 |
| 2015/0381598 | A1* | 12/2015 | Koved | H04L 63/08 726/3 |
| 2016/0021117 | A1* | 1/2016 | Harmon | H04L 63/105 726/1 |
| 2016/0087957 | A1* | 3/2016 | Shah | H04L 63/205 726/1 |
| 2016/0110719 | A1* | 4/2016 | Durney | G06Q 20/4014 705/44 |
| 2016/0180068 | A1* | 6/2016 | Das | G06F 21/32 726/7 |
| 2016/0197918 | A1* | 7/2016 | Turgeman | G06F 21/31 726/4 |
| 2016/0212141 | A1* | 7/2016 | Banerjee | H04L 63/0846 |
| 2016/0234206 | A1* | 8/2016 | Tunnell | H04W 4/70 |
| 2016/0239650 | A1* | 8/2016 | Mao | G06F 21/31 |
| 2016/0253490 | A1* | 9/2016 | Hong | G06F 21/316 726/7 |
| 2016/0292408 | A1* | 10/2016 | Zhang | G06F 21/32 |
| 2016/0294837 | A1* | 10/2016 | Turgeman | H04L 63/102 |
| 2016/0321446 | A1* | 11/2016 | Rouse | H04L 63/10 |
| 2016/0337403 | A1* | 11/2016 | Stoops | H04L 63/0861 |
| 2016/0373442 | A1* | 12/2016 | Bruch | H04L 63/08 |
| 2017/0011214 | A1* | 1/2017 | Cavanagh | G06F 21/46 |
| 2017/0011406 | A1* | 1/2017 | Tunnell | G06Q 20/40145 |
| 2017/0039568 | A1* | 2/2017 | Tunnell | G06Q 20/4014 |
| 2017/0053108 | A1* | 2/2017 | Jakobsson | H04L 63/0861 |
| 2017/0118205 | A1* | 4/2017 | Yang | H04L 9/3231 |
| 2017/0148074 | A1* | 5/2017 | Douglas | G06Q 30/0617 |
| 2017/0155675 | A1* | 6/2017 | Howe | H04L 63/0428 |
| 2017/0187697 | A1* | 6/2017 | Li | H04L 63/083 |
| 2017/0227995 | A1* | 8/2017 | Lee | G06F 1/1694 |
| 2017/0230179 | A1* | 8/2017 | Mannan | H04L 9/0897 |
| 2017/0289168 | A1* | 10/2017 | Bar | H04L 63/0853 |

OTHER PUBLICATIONS

Ian Urbina, "The Secret Life of Passwords," The New York Times Magazine, http://www.nytimes.com/2014/11/19/magazine/the-secret-life-of-passwords.html?_r=0, Nov. 23, 2014 and 2016, 15 pages.

* cited by examiner

AUTHENTICATING IDENTITY FOR PASSWORD CHANGES

This application is a continuation of U.S. patent application Ser. No. 15/335,711, filed on Oct. 27, 2016 and now U.S. Pat. No. 10,122,706. The above-referenced application is incorporated herein by reference in its entirety.

BACKGROUND

Technical Field

This disclosure relates generally to computer security, and, more specifically, to authenticating a password associated with a user.

Description of the Related Art

Identity fraud can be accomplished in a number of ways. In one frequently-used method, an attacker seeks to duplicate the account name and password of a target. This method is computationally tedious and other methods are often preferred. In some of these methods, attackers provide minimal, and often easy-to-acquire, information such as home address, last digits of a credit card, and full name, in order to reset the password of an account. Once the password has been reset, the attacker may gain access to the account and may rapidly gain access to other accounts that are linked to the compromised account.

Most identity access management systems operate by classifying access attempts as more or less risky. A recent history of repeated attempts to access an account with the wrong password can lock an account. Multi-factor, multi-device authentication and one-time passwords provide additional levels of protection. However, these protections are focused on attacks that attempt to guess or steal passwords. As noted above, other attack vectors rely on links between accounts and differences in password reset policies. For example, a Facebook account may be used to gain access to a Google account or a call to a human service representative can trigger a password reset. These attack vectors exist because users often forget passwords and account names, and the semi-automatic mechanisms created to allow account access recovery provide security holes.

SUMMARY

In an embodiment, a password risk evaluator may receive a request including a user identifier (ID) and a password. The password risk evaluator may retrieve a password preference model associated with the user ID, and may determine a risk score indicating a likelihood that the password is associated with the user ID. For example, the password preference model may be based on previous passwords used by the user, and may identify one or more characteristics, formulas, rules, or other indicia that have been employed by the user in creating passwords. If the password supplied in the request matches or is similar to one or more elements of the password preference model, it may be more likely that the password in the request is a password supplied by the user. That is, the risk score may be an authentication of the user, or part of the authentication of the user, in some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "risk assessment server that is configured to determine whether to authenticate the client computer system" is intended to cover, for example, a computer system that has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In an embodiment, a password risk evaluator may be employed to assign a risk score to a password/user ID combination. The password risk evaluator may maintain or be coupled to a password preferences database, which may store password preference models associated with various user IDs. As used herein, a password preference model is a set of one or more features or variables that may be input to an analytics model to calculate a risk score associated with the password. The features/variables may include features/variables that identify one or more characteristics, formulas, rules, or other indicia that have been employed in creating passwords by the user identified by the user ID. The various features/variables that can be included in the password preference model, such as the above examples and other examples, are referred to herein as elements of the password preference model or components of the password preference model.

While the discussion herein uses passwords and password preference models as an example, other embodiments may include any authentication code and a corresponding preference model. An authentication code may be any item of information that is unique to an individual or has a high likelihood of being unique to the individual. For example, authentication codes may include character-based passwords, graphical passwords (e.g. images selected by the user or assigned to the user, and identified by the user when logging in as authentication of the user), biometrics (e.g. fingerprint, iris scanning, or other physical attribute gathering from a user), cognitive passwords based on information known by the user, etc., and any combination of the above.

The password preference model may be based on previous passwords associated with the user ID, either for a given application that submits a request to the password risk evaluator or across multiple applications. If the password is successfully established for the user ID, the password may be added to the password preference model. In some embodiments, if the password risk evaluator does not have enough data for a password preference model (e.g. the password risk evaluator has not received enough previous passwords to develop a model with reasonable confidence), then the password risk evaluator may select a default password preference model. A default password preference model, as used herein, is a model that includes elements based on information other than the user's previous passwords (or elements based on other information in addition to the user's previous passwords). In some embodiments, multiple levels of models may be used (e.g. a default password preference model in addition to a password preference model developed from the user's previous password tendencies) to authenticate the password. The default password preference model may be based on, e.g., the passwords from all users in an organization to which the user belongs (e.g. a company that employs the user, a social organization that the user has joined, etc.) or a subset of such users, the passwords from all users of the application or a subset of users, usage and website descriptors (e.g. the password preference model corresponding to passwords created by the user at the user's work may differ from the password preference model corresponding to passwords created by the user for personal activities, etc.

A variety of mechanisms may be employed to develop a password preference model. For example, machine learning techniques may be used. Machine learning techniques generally include techniques employed by computer systems to learn, or infer, information from a data set without being explicitly programmed a priori to identify that particular information. That is, instead of specifically searching for predetermined characteristics, the machine learning techniques may be data driven, determining potential elements based on the data set provided for analysis. For example, the data set may include the set of previous passwords in this case. Alternatively or in addition, a single user password may be compared to password preference models corresponding to other individuals, such as other members of the user's organization. Individuals in an organization may exhibit alignment around certain elements in the password preference model, for example. The machine learning techniques may process the previous passwords searching for patterns among the set (e.g. a word or words that are used frequently, capitalization or special characters, replacement of vowels with symbols, numbers of characters, symbols, etc., use of a random password generator or lack of use, and/or the location of various patterns within in the passwords). Other embodiments may include elements that are defined a priori and machine learning, or elements that are defined a priori alone.

Figure 1:
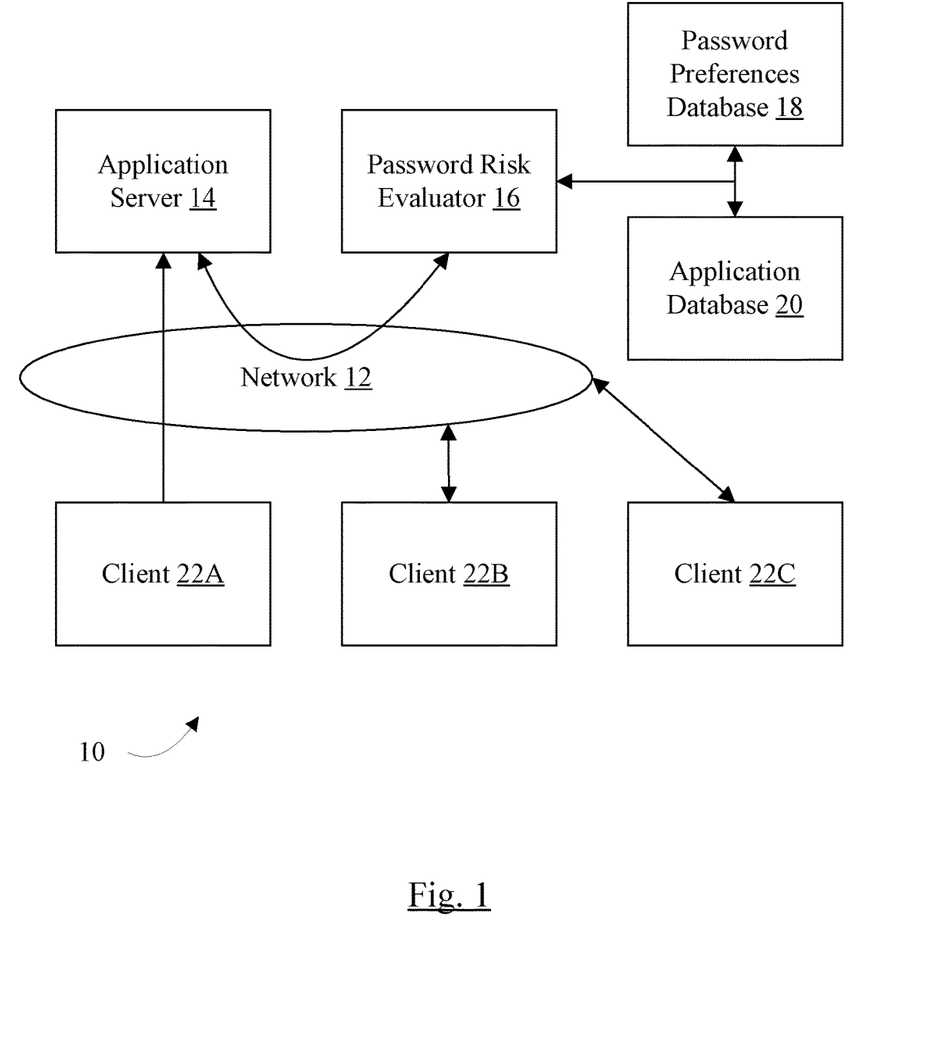
FIG. 1 is a block diagram illustrating an embodiment of a password authentication system.

Turning now to FIG. 1, a block diagram of one embodiment of an authentication system 10 is depicted. In the illustrated embodiment, the authentication system 10 includes a network 12, an application server computer system 14, a password risk evaluator computer system 16, and one or more client computer systems 22A-22C. The password risk evaluator server computer system 16 may include one or more password preferences databases 18 and/or one or more application databases 20. In some embodiments, the password preferences database 18 and/or the application database 20 may be on one or more different computer systems from the password risk evaluator 16. The various computer systems in FIG. 1 may be more briefly referred to without the words "computer system" (e.g. application server 14, password risk evaluator 16, etc.). Alternatively, the various computer systems may be more generically viewed as software executable on a computer system, where the particular computer system may execute more than one of the various software components (or the components may be executed on multiple distributed computer systems).

The network 12 may be a computer network of any type. For example, the network 12 may be a private network having restricted access for external devices. For example, in some embodiments, the network 12 may a local area network (LAN) having a gateway coupling the LAN to the Internet. The gateway may implement a firewall that restricts which incoming traffic is permitted to enter the network 12 as well as restrict the destinations in the network 12 that are permitted to receive the traffic. Alternatively, the network 12 may be a wide area network (WAN) which may be private or public (e.g. the Internet). The network 12 may include wireless networks, wired networks, or any combination thereof.

The application server 14, in one embodiment, may be a computer system that executes one or more applications which may be used by users on the client computer systems 22A-22C. For example, the application server 14 may include an application to provide access to a user's account with a business with which the user has a relationship (e.g. a bank holding the user's bank accounts, an information service such as a newspaper or other news source, various "stores" from which users may purchase merchandise, etc.).

As another example, the applications may include various software applications that the user may execute to accomplish tasks (e.g. productivity software such as word processing software, spreadsheet software, presentation software, email management software, etc.). The applications may be available to the user by subscription, in a software as a service model, for example.

Generally, the application server 14 may authenticate the user prior to providing the user access to the applications, accounts, etc. The authentication process may be a mechanism by which the user identifies himself/herself to the satisfaction of the application server 14 (e.g. the user appears to in fact be the user and not a third party such as a hacker, identity thief, etc.). The authentication process may include the user presenting a user ID and password. Additional information may or may not be used in the authentication process. A user ID, as used herein, is any identifier that is assigned to the user and identifies the user. The user ID may be a user name created by the user when initially registering with the application server 14, an email address used by the user, etc. The password may also be created by the user, and may be changed by the user as desired or in compliance with application server requirements for periodically changing the password. A password reset may also be requested by a user if the user forgets his/her password or for some other reason desires a reset of the password. Any form of password modification may be subject to evaluation against one or more password preferences models (and possibly other factors consider in evaluation the risk of the password change). Password modification may include an initial password created when the account is first created for/by the user with the user ID, a password change request after the current password has been entered (and thus the user ID is authenticated), a password reset request presented when the previous password has not been supplied or authenticated, etc.

A password reset request may be any request initiated to establish a new password when the previous password is not entered prior to or as part of the modification of the password from the previous password to the new password. For example, a password reset request may be initiated by providing a user ID and selecting "forgot my password" or the like. "Forgot my password"-style password reset requests may be used when there is some level of trust between the user and the site controlling the access based on the password associated with the user ID. For example, the application server 14 may communicate with the user via other information in the user's account (e.g. an email address, a cell phone number, etc.). The application server 14 may provide a link for the user to use to reset his/her password, a code to be entered at the application server 14, etc. Alternatively, the application server 14 may provide a temporary password that is to be changed when the user signs in with the temporary password. A password reset request may also be initiated by an administrator who has been authenticated by the application server 14 and who has appropriate permissions to reset other user's passwords.

The password risk evaluator 16 may be used to evaluate a password presented by a user to the application server 14 to be established as a new password associated with the user ID. In other embodiments, a password submitted to authenticate the user ID for login may be similarly evaluated. The application server 14 may transmit a secure request including at least the user ID and the password, and the password risk evaluator 16 may assign a risk score based on the password and a password preferences model associated with the user ID. In an embodiment, the risk score may be a flag indicating yes (the password appears to be similar to other passwords used by the user) or no (the password does not appear to be similar to other passwords). In other embodiments, the risk score may be a numerical value which may be increased or decreased to indicate relative levels of similarity between the password and other passwords. The less similar that the presented password is to the password preferences model, the greater the risk that the entity presenting the password is not in fact the authorized user.

In an embodiment, the password risk evaluator 16 may implement one or more machine learning techniques in developing the password preferences model. For example, an embodiment may include one or more of the following: (1) use one or more natural language processing (NLP) techniques to process the password string to identify the elements of the password, such characters, numbers, symbols, etc., and/or combinations/sequences thereof; (2) use one or more named entity recognition (NER) techniques to further identify the named entity (e.g. the user associated with the user ID) such as people, animal, organization, places, plants, etc., and/or combinations of the above; (3) translate the elements into one or more pattern sequences; (4) create the password preferences model features based on the translated pattern sequences; (5) generate one or more model scores based on the string distance between one or more pattern sequences from the new password to one or more pattern sequences of previous passwords for the same user; (6) use a Bayesian model to compute a first probability score of the new password on this user and a second probability score of the new password on all users; (7) use the second probability score as a priori to smooth the first probability score, or as a default score if there is no previous password for this user; and (8) use one or more score fusion techniques to combine the string distance scores and probability scores to generate the overall score for this password. Other embodiments may use any subset of the above, and may include other techniques with the above or any subset of the above, as desired.

The password risk evaluator 16 may return the risk score to the application server 14, which may determine actions to take based on the risk score. For example, the application server 14 may require additional authentication procedures, provide limited access to the account (e.g. read-only access to the server's information, but no viewing of the account information), or the attempt may be denied. The application server 14 may implement any desired additional authentication procedures. For example, in some cases, one or more of the following may be additional authentication procedures: require the use of security questions, require a call from or to the owner of the server, require the user to send a video speaking a given phrase, require the user to go to a third party location such as a bank to verify his/her identity in person, etc.

In an embodiment, a password preferences model may further include elements explicitly provided by the user (once the user has been authenticated). A sophisticated user, for example, may consciously apply a set of rules in determining the user's passwords. The user may supply an expression or other description of the rules, and the expression/description may become elements of the user's password preferences model.

The application server 14 may be configured to transmit a request to the password risk evaluator 16 in response to various presentations of passwords by a user. For example, when the user initially registers on the application server and presents an initial password for the account, the application server 14 may transmit a request. When the user attempts to change an existing password (voluntarily or involuntarily), the application server 14 may transmit a request. When the user attempts to reset a password (e.g. due to forgotten password), the application server 14 may transmit a request. When a user presents a password that is not the correct password to sign in to the application server 14, the application server 14 may transmit a request. In this case, the application server 14 may be attempting to determine if the erroneous password is still similar to the password preferences identified by the user. If the erroneous password is not similar, it may be a nefarious actor attempting to sign in with brute force password guessing, for example.

Additionally, the application server 14 may inform the password risk evaluator 16 when a new password is established for the user ID. The new password may be established for the user ID when the user ID initially registers with the application server 14, when the user intentionally changes his/her password on the application server 14 (of his/her own accord or when prompted by the application server 14 according to password policies implemented by the application server 14), when the user requests a password reset (e.g. due to a forgotten password), etc. The password risk evaluator 16 may update the password preference model associated with the user ID with the new password. Thus, the password risk evaluator may reflect the current password. Additionally, if a given user's password preferences change over time, the password preference model may adapt to the changes.

The password preferences database 18 may store various password preference models corresponding to various users. Generally, as used herein, a database refers to any organized data storage structure. For example, a database may be a lookup table (indexed by user ID, for example), a list, relational database, document-oriented data structure, NoSQL form (e.g. key, value pairs), etc.

The application database 20 may store additional data which may be used by the password risk evaluator 16, in an embodiment. The application database 20 may store, e.g. all passwords that are used by users of an application (or a subset of such passwords). The application database 20 may be a database of passwords used by a particular user in various different applications (e.g. a so-called password vault used by the user). The application database 20 may be used by the password risk evaluator 16 to generate default password preference models for a given application and/or user, in some embodiments.

The client computer systems 22A-22C, in one embodiment, may be computer systems accessible to the users. A given client computer system 22A-22C may be dedicated to the user, owned by the user, in possession of the user, etc. The client computer systems 22A-22C may be any type of computing device (desktop, server, laptop, work station, tablet computer, smart phone, any internet connected device such is internet-of-things (IoT) devices like thermostats, cars, appliances, industrial control systems, cameras, sensors, etc., etc.).

While different computer systems have been shown in FIG. 1 for the application server 14, the password risk evaluator 16, and the databases 18 and 20, one or more of the above may be combined onto a server computer system or other computer system or may be implemented on multiple computer systems in a distributed computing model or federated computing model. One or more may be local to the client computer systems 22A-22C, in some embodiments (e.g. the password vault and/or the password preference model information may be gathered locally in the client computer systems 22A-22C). Any combination of computer systems and local (to the client computer system 22A-22C) or remote (on a server) execution may be used in various embodiments.

Figure 2:
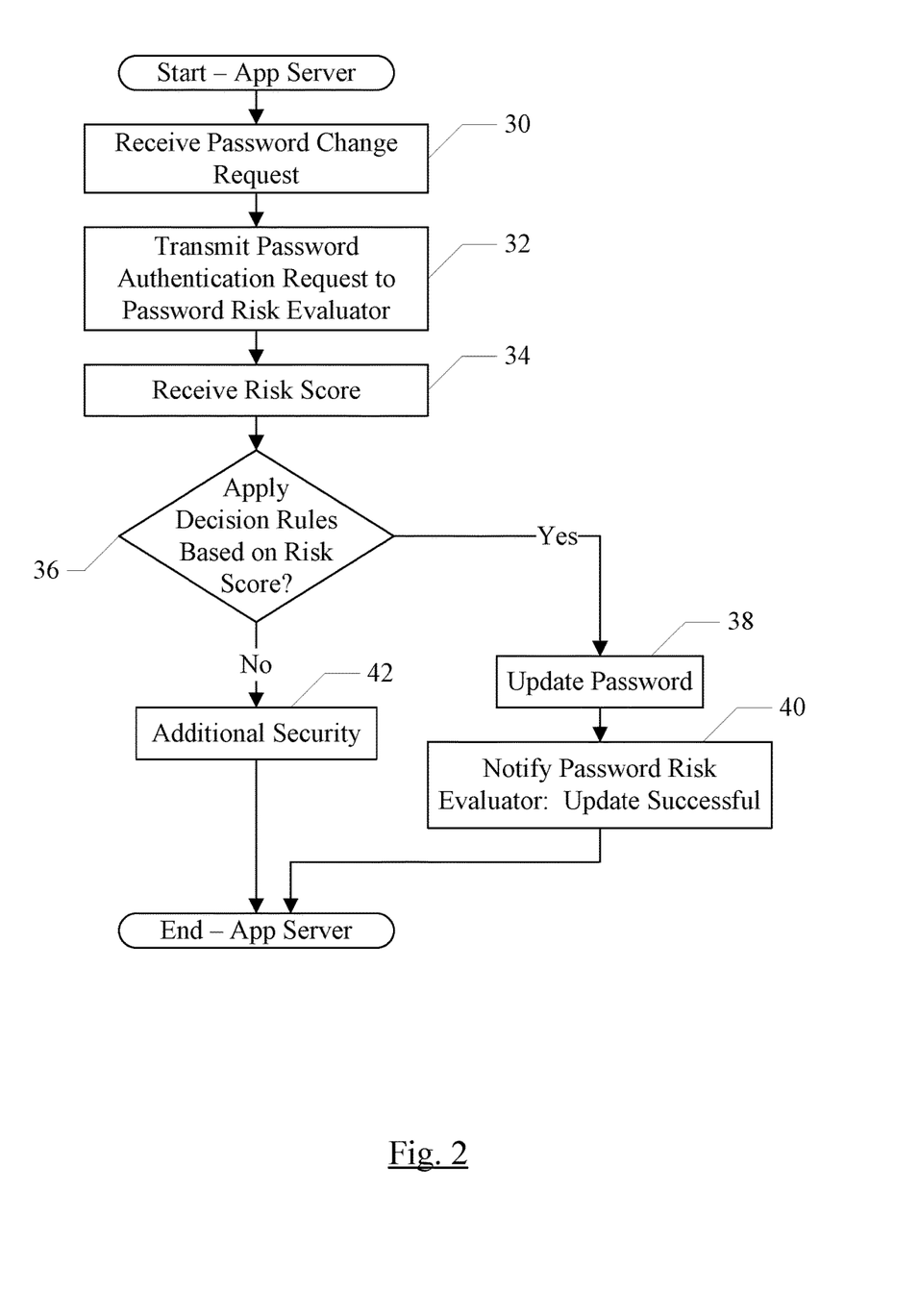
FIG. 2 is a flowchart illustrating an embodiment of a password update at an application server.

Turning now to FIG. 2, a flowchart is shown illustrating certain operations of one embodiment of the application server 14. While the blocks are shown in a particular order for ease of understanding, other orders may be used. The application server 14 may include instructions which, when executed on a computer system, cause the computer to perform the operations illustrated in the flowchart.

The application server 14 may receive a password change request from a user (e.g. a user on one of the client computer systems 22A-22C) (block 30). The password change request may be to change an existing password, a mandatory password change due to risk factors or defined expiration, or may be a password reset request due to a forgotten password. The password change request may also be part of registering with the application server 14, but may be a simplified form of change. The application server may generate a password authentication request and transmit it to the password risk evaluator 16 (block 32). The password authentication request may include the user ID that identifies the user, the password to be established for user ID, and optionally various other data as discussed above (location, day, date, time, etc.). Subsequently, the application server 14 may receive the risk score from the password risk evaluator 16 (block 34). The application server 14 may apply one or more decision rules based on the risk score to determine if the risk is acceptable. If the risk is acceptable (decision block 36, "yes" leg), the application server 14 may update the password for the user (block 38) and may notify the password risk evaluator 16 that the update has been performed (i.e. the new password has been established for the user) (block 40). On the other hand, if the risk is unacceptable (decision block 36, "no" leg), the application server 14 may require additional security and/or reject the update (block 42).

A risk may be deemed acceptable (risk is low) or unacceptable (risk in high) in a variety of fashions. For example, the application server 14 may define one or more thresholds of risk score that would be deemed acceptable, and may determine corrective actions (if any) based on the level of risk. For example, the highest levels of risk may involve third party verification of the user (e.g. in person at a bank or other trustworthy organization), blocking login, etc. Lower levels of risk, but still not lower than the lowest acceptable threshold, may result in additional security requirements that are less aggressive than those listed above. Any number of thresholds may be used in various embodiments. Additionally, the level of a given threshold may differ depending on the sensitivity of the application. For example, an application server 14 providing access to a bank account may be highly selective (thresholds at very low levels of risk) as compared to a subscription information source such as an online newspaper.

Operation similar to that shown in FIG. 2 may be invoked any time that user ID/password authentication is desired. For example, if a user enters an incorrect password, that incorrect password and user ID may be scored for risk. If the risk is high, fewer attempts to login correctly may be allowed, or other heightened security measures may be employed if the user logs in correctly in a subsequent attempt. If the risk is low, a normal login may proceed if the correct password is entered in the subsequent attempt.

Figure 3:
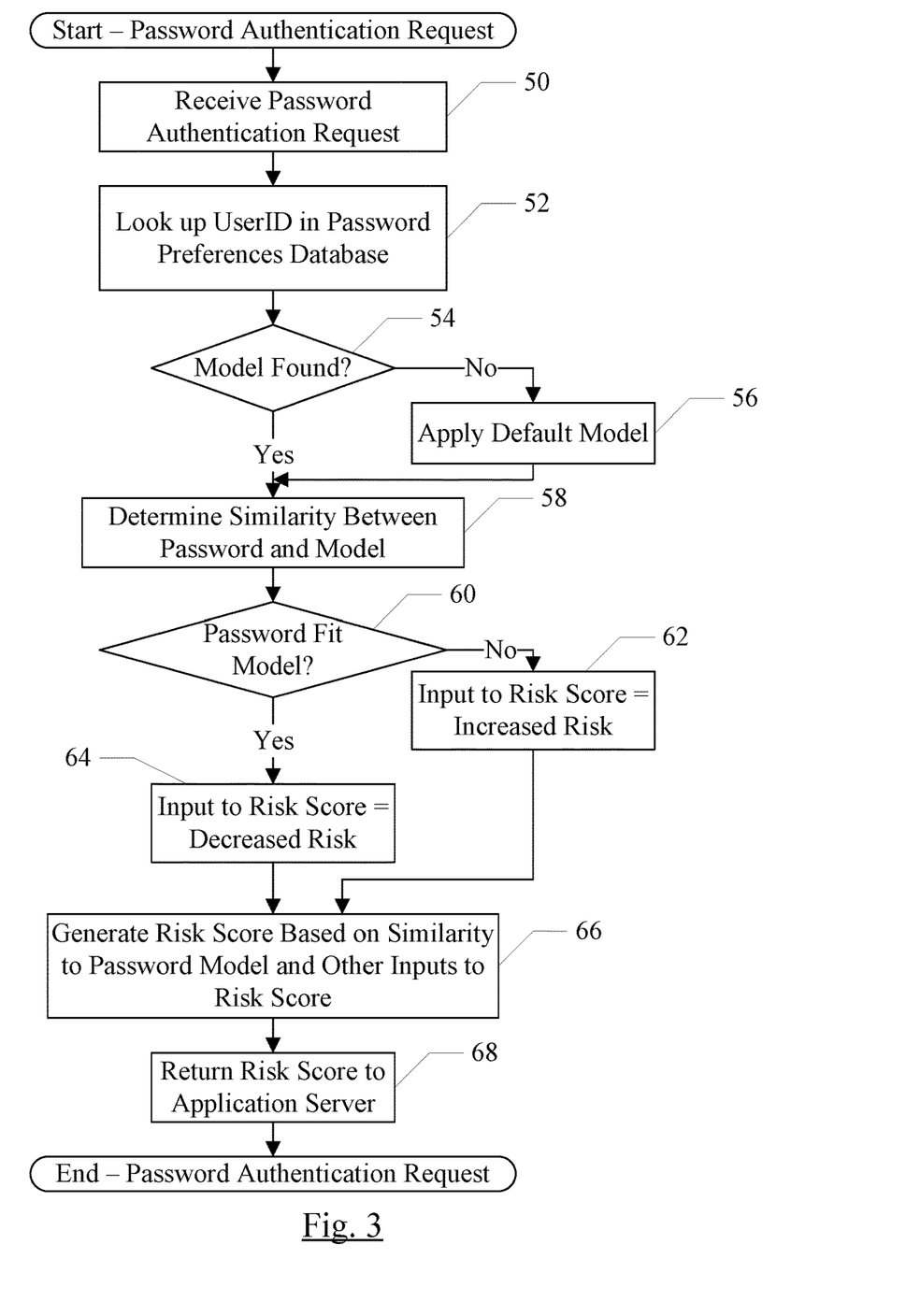
FIG. 3 is a flowchart illustrating an embodiment of password authentication at a password risk evaluator.

FIG. 3 is flowchart illustrating operation of certain operations of one embodiment of the password risk evaluator 16. While the blocks are shown in a particular order for ease of understanding, other orders may be used. The password risk evaluator 16 may include instructions which, when executed on a computer system, cause the computer to perform the operations illustrated in the flowchart.

The password risk evaluator 16 may receive the password authentication request from the application server 14 (block 50). The password risk evaluator 16 may look up the user ID from the request in the password preferences database, and if a model is not found for the user ID (decision block 54, "no" leg), the password risk evaluator 16 may apply a default password preferences model (block 56). Alternatively or in addition, one or more other models in the password preferences database may be evaluated against the password on models that have high matches may be selected. Similarly, the default model may be used if a model is found but not enough passwords have been received to make the model accurate for the user (e.g. more than a threshold number of passwords may be observed before the model is viewed as accurate). In either case (model found or default model applied), the similarity between the password in the request and the password preference model is determined (block 58). The password preference model may be a multi-dimensional space of elements, and the password may be classified against model. The distance between the password and other passwords in the model may be calculated. Based on the fit of the password to the model, the input to the risk score is either an increased risk if the fit is not good (decision block 60, "no" leg and block 62) or a decreased risk if the fit is good (decision block 60, "yes" leg) and block 64. The password risk evaluator 16 may also consider other inputs to the risk score and may generate the risk score (block 66). For example, the location, device ID, and date/time may be used in some embodiments to generate the risk score. The password risk evaluator may return the calculated risk score to the application server (block 68). It is noted that increased/decreased risk as determined from the password preferences model (block 58, decision block 60, and blocks 62 and 64) may be part of overall risk score generation (block 66), but is shown separately for clarity related to the pass preferences models disclosed herein.

In the context of passwords and password preferences, a password may be viewed as "similar" to the password preference model if the password matches one or more of the dimensions (elements) of the model or if the password's elements, when mapped into the model, are near the corresponding elements of previous passwords as indicated by the model.

Figure 4:
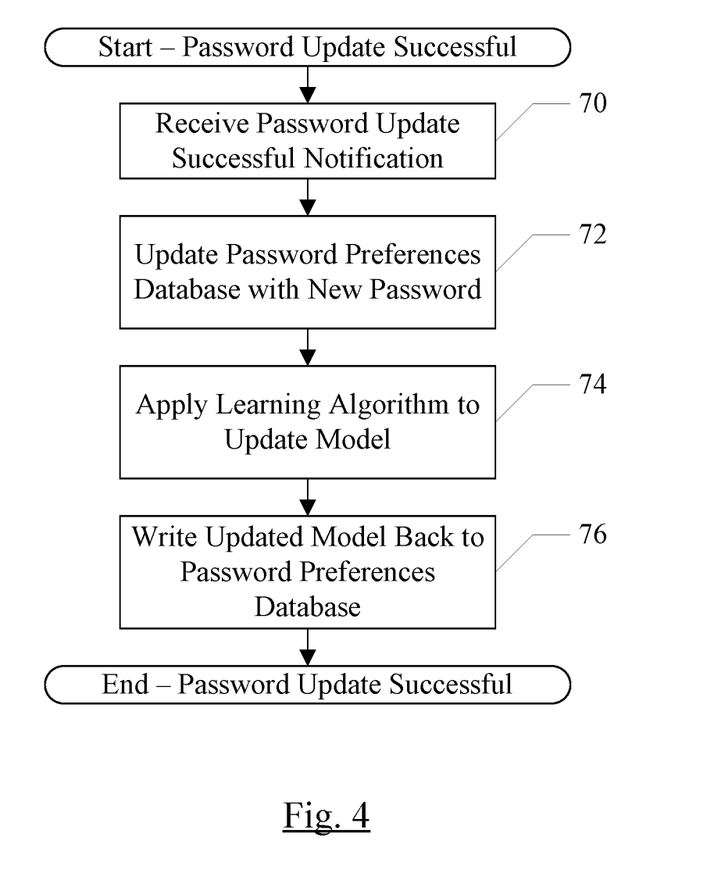
FIG. 4 is a flowchart illustrating an embodiment of completion of a password update.

FIG. 4 is flowchart illustrating operation of certain operations of one embodiment of the password risk evaluator 16. While the blocks are shown in a particular order for ease of understanding, other orders may be used. The password risk evaluator 16 may include instructions which, when executed on a computer system, cause the computer to perform the operations illustrated in the flowchart.

The password risk evaluator 16 may receive the password update successful notification from the application server 14 (block 70). The notification may include the password and the user ID. Since the notification is generally responsive to determining that the risk score, the notification may be received for a given password subsequent to the password risk evaluator 16 computing the risk score from the password. The password risk evaluator 16 may retrieve the password preferences model for the user ID from the password preferences database 18, and may update the model with the new password (block 72). For example, the model may include the most recent previous passwords for learning purposes, or may include a pointer to a list of previous passwords to which the new password is added. The password risk evaluator 16 may apply the learning algorithm to the new password to update the elements of the model (block 74). The updated model may be written back to the password preferences database 18 (block 76)

Figure 5:
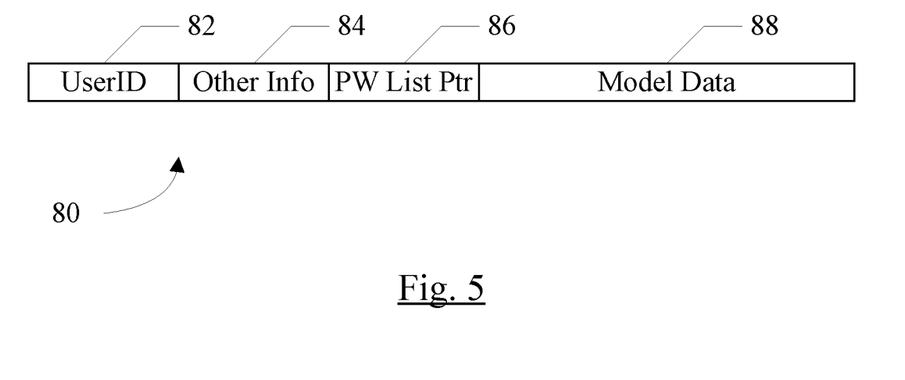
FIG. 5 is a block diagram illustrating a embodiment of a password preference database entry.

FIG. 5 is an example entry 80 in the password preferences database 18, for one embodiment. The entry 80 may include a user ID field 82 for the user ID associated with the entry 80. Alternatively, the user ID may be transformed by the application server 14 or the password risk evaluator 16 to a different representation for use in the password preferences database 18 for additional security. For example, the user ID may be tokenized, substituted, or transformed using any algorithm to generate the value for the user ID field 82. The user ID in the field 82 may be matched to an input user ID to determine the model to output. Various other information may be included as well, in some embodiments (field 84), such as the location and time/date information discussed previously. A list of previous passwords may be useful for updating the model, thus the N most recent passwords may be saved, where N is an integer greater than one. The list may be stored in the entry 80, or a pointer to a list of the N most recent passwords may be stored (field 86). As mentioned previously, in some embodiments the N most recent passwords are stored. The previous passwords may include passwords from more than one application. Alternatively, the previous passwords may be from the same application. Additionally, the model data (identifying the multidimensional matrix of determined elements for the password) may be included in a model data field 88 (or the field 88 may be pointer to a location storing the data.

Exemplary Computer System

Figure 6:
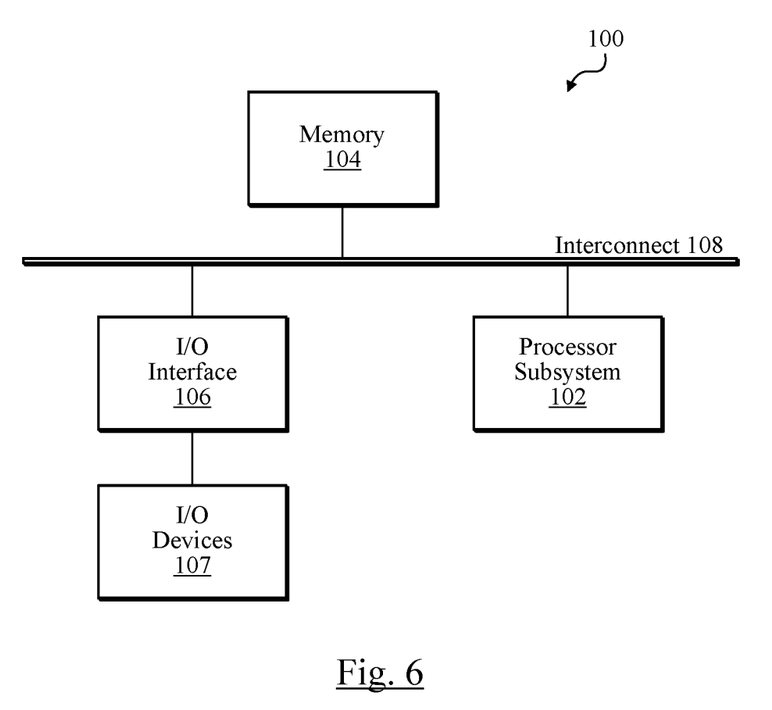
FIG. 6 is a block diagram illustrating an exemplary computer system.

Turning now to FIG. 6, a block diagram of an exemplary computer system 100, which may implement one or more computer systems 14, 16, and/or 22A-22C, is depicted. Computer system 100 includes a processor subsystem 102 that is coupled to a system memory 104 and I/O interfaces(s) 106 via an interconnect 108 (e.g., a system bus). I/O interface(s) 106 is coupled to one or more I/O devices 107. Computer system 100 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 100 is shown in FIG. 6 for convenience, system 100 may also be implemented as two or more computer systems operating together.

Processor subsystem 102 may include one or more processors or processing units. In various embodiments of computer system 100, multiple instances of processor subsystem 102 may be coupled to interconnect 108. In various embodiments, processor subsystem 102 (or each processor unit within 102) may contain a cache or other form of on-board memory.

System memory 104 is usable store program instructions executable by processor subsystem 102 to cause system 100 perform various operations described herein. System memory 104 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 100 is not limited to primary storage such as memory 104. Rather, computer system 100 may also include other forms of storage such as cache memory in processor subsystem 102 and secondary storage on I/O Devices 107 (e.g., a hard drive, storage array, etc.). In some embodiments, these other forms of storage may also store program instructions executable by processor subsystem 102. In some embodiments, memory 104 may include software for application server 14, password risk evaluator 16, and/or client systems 22A-22C.

I/O interfaces 106 may be any of various types of interfaces configured to couple to and communicate with other devices, according to various embodiments. In one embodiment, I/O interface 106 is a bridge chip (e.g., Southbridge) from a front-side to one or more back-side buses. I/O interfaces 106 may be coupled to one or more I/O devices 107 via one or more corresponding buses or other interfaces. Examples of I/O devices 107 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 100 is coupled to a network via a network interface device 107 (e.g., configured to communicate over WiFi, Bluetooth, Ethernet, etc.).

One or more of the system memory 104 components and/or the I/O devices 107 may include a computer accessible storage medium storing program instructions forming the software described herein. The program instructions may be executable on a computer to implement the operation described above for various software modules. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium may store data in a non-transitory manner, where non-transitory in this context may refer to not transmitting the instructions/data on a signal. For example, non-transitory storage may be volatile (and may lose the stored instructions/data in response to a power down) or non-volatile. A carrier medium may include computer accessible storage media as well as transmission media such as wired or wireless transmission.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable storage medium having stored thereon program instructions that are computer-executable to perform operations comprising:
   receiving, at a computer system, a user identifier and a first authentication code, wherein the user identifier specifies a user;
   retrieving, by the computer system, an authentication code preference model for the user identifier from a database, wherein the authentication code preference model is provided from an entry in the database that corresponds to the user identifier, and wherein the authentication code preference model is based on one or more previous authentication codes successfully established as authentication codes to authenticate the user, wherein the authentication code preference model describes one or more user tendencies indicated in a content of the previous authentication codes, wherein the user tendencies comprise tendencies employed in creating the content of the previous authentication codes; and
   determining, by the computer system based on the first authentication code and the authentication code preference model, a value indicating a likelihood that the first authentication code is created by the user rather than a third party impersonating the user, wherein the determining is based on a similarity between the one or more user tendencies described by the authentication code preference model and a content of the first authentication code.

2. The non-transitory computer-readable storage medium of claim 1, wherein the program instructions are computer executable to perform:
   updating the authentication code preference model to reflect the first authentication code in response to an indication that the first authentication code has been established for the user.

3. The non-transitory computer-readable storage medium of claim 2, wherein the first authentication code is established for the user responsive to a risk level associated with the first authentication code, wherein the value is included in determining the risk level.

4. The non-transitory computer-readable storage medium of claim 2, wherein the program instructions are computer executable to perform:
   receiving the indication that the first authentication code has been established subsequent to determining the value.

5. The non-transitory computer-readable storage medium of claim 4, wherein the first authentication code is established responsive to the value indicating that the likelihood exceeds a threshold level.

6. The non-transitory computer-readable storage medium of claim 2, wherein the updating comprises applying a machine learning algorithm in the authentication code preference model to the first authentication code and the one or more previous authentication codes.

7. The non-transitory computer-readable storage medium of claim 6, wherein the machine learning algorithm comprises:
using at least one natural language processing technique to identify one or more authentication code elements;
using at least one named entity recognition technique to further identify the user;
translating the authentication code elements into one or more pattern sequences;
updating elements of the authentication code preference model based on the pattern sequences;
generating one or more model scores based on a distance between one or more pattern sequences from the first authentication code to one or more pattern sequences of the previous authentication codes for the user;
using a Bayesian model to compute a first probability score of the first authentication code on the user and a second probability score on all users;
using the second probability score as a priori to smooth the first probability score; and
using one or more score fusion techniques to combine the one or more model scores, the first probability score, and the second probability scores to generate an overall score for the first authentication code.

8. The non-transitory computer-readable storage medium of claim 6, wherein the retrieving comprises selecting a default authentication code preference model in the event that a number of the one or more previous authentication codes is less than a threshold number of authentication codes.

9. The non-transitory computer-readable storage medium of claim 8 wherein selecting the default authentication code preference model is performed in the event that the number is one.

10. The non-transitory computer-readable storage medium of claim 8 wherein selected the default authentication code preference model is performed responsive to other data associated with the user in the event that the number is zero.

11. The non-transitory computer-readable storage medium of claim 1, wherein the user identifier and the first authentication code are included in an authentication code reset request.

12. The non-transitory computer-readable storage medium as recited in claim 1, wherein the program instructions are computer executable to perform:
updating the authentication code preference model to reflect the first authentication code in response to an indication that the first authentication code has been successfully established for the user, wherein the updating comprises applying a machine learning algorithm to the first authentication code and the one or more previous authentication codes in the authentication code preference model, wherein the machine learning algorithm comprises:
using at least one natural language processing technique to identify one or more authentication code elements;
translating the authentication code elements into one or more pattern sequences; and
updating elements of the authentication code preference model based on the pattern sequences.

13. A non-transitory computer-readable storage medium having stored thereon program instructions that are computer-executable to perform operations comprising:
receiving, at a computer system, a user identifier corresponding to a user and a password update for the user identifier, wherein the password update includes a first password that has been successfully established as a current password for the user;
retrieving, by the computer system, a password preference model for the user identifier from a database, wherein the password preference model is provided from an entry in the database that corresponds to the user identifier, and wherein the password preference model is based on one or more previous passwords successfully established as passwords for the user, wherein the password preference model describes one or more user tendencies indicated in a content of the previous passwords, wherein the user tendencies comprise tendencies employed in creating the content of the previous passwords;
updating, by the computer system, the password preference model responsive to the password update; and
writing, by the computer system, the password preference model back to the database.

14. The non-transitory computer-readable storage medium of claim 13, wherein the updating comprises applying a machine learning algorithm to the first password and the one or more previous passwords.

15. The non-transitory computer-readable storage medium of claim 14, wherein, in the event that a number of the one or more previous passwords is less than a threshold, the password preference model associated with the user identifier is a default password preference model.

16. The non-transitory computer-readable storage medium of claim 14, wherein at least one of the one or more previous passwords is associated with a first application and the first password is associated with a separate application different from the first application.

17. A method comprising:
receiving, at a computer system, a user identifier and a first password, wherein the user identifier specifies a user;
retrieving, by the computer system, a password preference model for the user identifier from a database, wherein the password preference model is provided from an entry in the database that corresponds to the user identifier, and wherein the password preference model was previously developed by the computer system based on one or more previous passwords successfully established as passwords to authenticate the user, wherein the password preference model describes one or more user tendencies indicated in a content of the previous passwords, wherein the user tendencies comprise tendencies employed in creating the content of the previous passwords;
determining, by the computer system, a similarity between a content of the first password and the password preference model; and
returning, by the computer system, a value indicating a likelihood that the first password is associated with a user rather than a third party impersonating the user, wherein the value is based on the similarity.

18. The method of claim 17, further comprising
updating the password preference model in response to an indication that the first password has been established for the user.

19. The method of claim 18, further comprising:
receiving the indication that the first password has been established subsequent to returning the value.

20. The method of claim 19, wherein the first password is established responsive to the value indicating that the likelihood exceeds a threshold level.

\* \* \* \* \*